US007272236B2

(12) United States Patent
Nicholson et al.

(10) Patent No.: US 7,272,236 B2
(45) Date of Patent: Sep. 18, 2007

(54) SPEAKER ASSEMBLY FOR A TELEVISION CABINET

(75) Inventors: John Edward Nicholson, Indianapolis, IN (US); Patrick Thomas Whitsett, Greenwood, IN (US); Lawrence Charles Coan, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 526 days.

(21) Appl. No.: 10/752,107

(22) Filed: Jan. 6, 2004

(65) Prior Publication Data

US 2004/0165745 A1    Aug. 26, 2004

Related U.S. Application Data

(60) Provisional application No. 60/438,422, filed on Jan. 6, 2003.

(51) Int. Cl.
*H04R 25/00* (2006.01)
(52) U.S. Cl. ...................................... 381/345; 381/386
(58) Field of Classification Search ............... 381/386, 381/345, 354, 392, 388; 181/198, 199, 148; 348/825, 836, 838, 839; 455/575.1, 575.8, 455/575.9
See application file for complete search history.

(56) References Cited

U.S. PATENT DOCUMENTS

| 3,835,256 A | * | 9/1974 | Wieder | 381/341 |
|---|---|---|---|---|
| 5,278,361 A | | 1/1994 | Field | 181/145 |
| 5,640,461 A | * | 6/1997 | Ebert et al. | 381/386 |
| 6,415,036 B1 | | 7/2002 | Ritter et al. | 381/388 |
| 6,580,802 B1 | | 6/2003 | Naito et al. | 381/388 |
| 6,658,120 B2 | | 12/2003 | Wood | 381/104 |
| 6,661,473 B1 | | 12/2003 | Teshima et al. | 348/747 |
| 2003/0128503 A1 | | 7/2003 | Takahashi | 361/681 |

* cited by examiner

*Primary Examiner*—Curtis Kuntz
*Assistant Examiner*—Tuan Duc Nguyen
(74) *Attorney, Agent, or Firm*—Joseph J. Laks; Harvey D. Fried; Patricia Verlangieri

(57) ABSTRACT

A speaker housing for mounting at least one speaker therein is disclosed. The speaker housing includes a speaker enclosure sealed to a speaker cover. The speaker enclosure includes an opening for sealing a connector attached to a crossover printed circuit board assembly thereto. The connector protrudes through the opening in the speaker enclosure while the printed circuit board to which it is attached compresses a compressible gasket against a wall surrounding the opening in the speaker enclosure, sealing the connector thereto. The chassis wiring is coupled to the connector providing an inexpensive sealed interface between the electronics chassis and the crossover board assembly.

8 Claims, 2 Drawing Sheets

SPEAKER ASSEMBLY FOR A TELEVISION CABINET

CROSS-REFERENCE TO RELATED APPLICATIONS

This application claims the benefit of U.S. Provisional Patent Application Ser. No. 60/438,422, entitled "PRINTED CIRCUIT BOARD AS COMPONENT OF AIRTIGHT ENCLOSURE" and filed Jan. 6, 2003, which is incorporated by reference herein in its entirety.

FIELD OF THE INVENTION

The present invention is directed to a television apparatus and more particularly, to a speaker pod assembly for housing at least one loudspeaker in a television apparatus.

BACKGROUND OF THE INVENTION

Conventional projection televisions are typically housed, in heavy wooden cabinets and are accompanied by high performance loudspeakers. Such heavy wooden cabinets usually have isolation enclosures formed therein to accommodate the high performance loudspeakers.

Presently, however, the market is demanding smaller television cabinet sizes while at the same time desiring larger screen sizes. Improvements in technology have made lightweight optics packages possible, resulting in the production of larger television screens. To meet the demand for smaller television cabinets, these improved projection television packages are being mounted in compact, stylized television cabinets known as "direct view" television cabinets. The direct view cabinets are typically constructed using injection-molded plastic parts that are lighter and more aesthetically pleasing than heavy wooden cabinets.

Injection-molded plastic parts typically used to accommodate the high performance speakers include a speaker housing having a speaker enclosure sealed to a speaker cover. However, a notch is generally molded between the speaker cover and the speaker enclosure to allow chassis wiring to reach an internal crossover PCB (printed circuit board) assembly. Use of the notch compromises the seal between the speaker enclosure and the speaker cover, since the chassis wiring does not completely fill the notch so that deterioration of the sound quality may occur.

Therefore, a need exists in the art for a sealed interface between the electronics chassis and the crossover board assembly.

SUMMARY OF THE INVENTION

The disadvantages associated with the prior art are overcome by an apparatus for sealing chassis wiring to the speaker housing in a television cabinet. Specifically, an apparatus according to an embodiment of the invention comprises a speaker housing for mounting at least one speaker therein. The speaker housing includes a speaker enclosure sealed to a speaker cover. The speaker enclosure includes an opening for sealing a connector attached to a crossover printed circuit board assembly thereto. The connector protrudes through the opening in the speaker enclosure while the printed circuit board to which it is attached compresses a compressible gasket against a wall surrounding the opening in the speaker enclosure, sealing the connector thereto. The chassis wiring is coupled to the connector providing an inexpensive sealed interface between the electronics chassis and the crossover board assembly.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
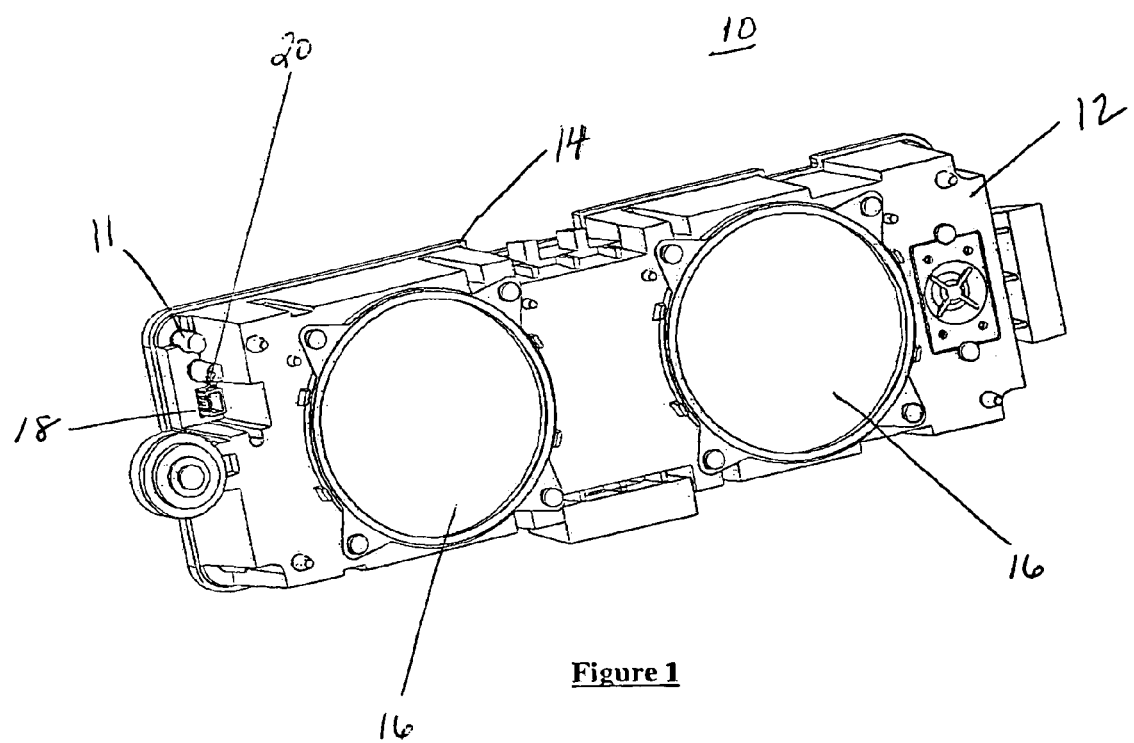
FIG. 1 depicts an exemplary sealed speaker housing of the present invention.

FIG. 1 depicts an exemplary sealed speaker housing 10 that provides a sealed interface between the electronics chassis and the crossover board assembly. Although the depicted embodiment is described below with respect to a compact, stylized television cabinet (hereinafter referred to as a "direct view" television cabinet), it should be understood that the present invention can be employed in television cabinets in general. Furthermore, the present invention can accommodate several loudspeaker configurations that include, but are not limited to, one midrange loudspeaker and one tweeter per audio channel.

As shown in FIG. 1, the housing 10 includes a speaker enclosure 12 and a speaker cover 14. The speaker cover 14 is sealed to the speaker enclosure 12 with a plurality of attachment members 11 (one of which is shown in FIG. 1). One exemplary attachment member 11 may include a screw. The speaker enclosure 12 and the speaker cover 14 are constructed using, illustratively, injection-molded plastic.

The speaker enclosure 12 has speaker openings 16 within which loudspeakers (not shown) are mounted. The speaker enclosure also includes an opening 18 through which a crossover board connector 20 protrudes providing an inexpensive sealed interface between the electronics chassis (not shown) and the crossover board assembly (not shown).

Figure 2:
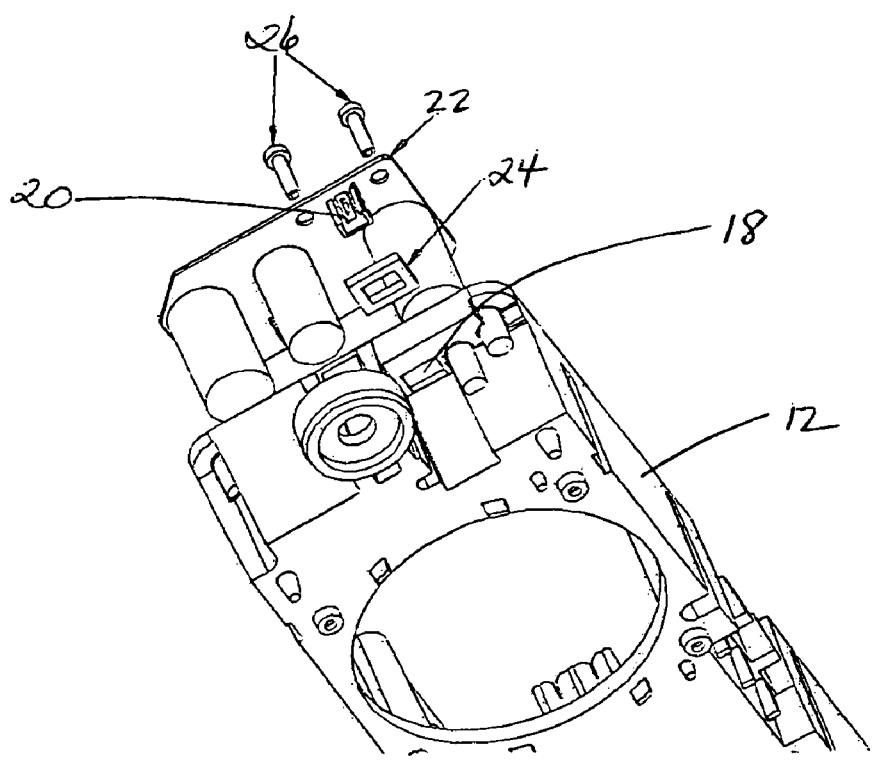
FIG. 2 depicts a bottom, side view of a portion of the speaker housing, an interface connector and a crossover PCB (printed circuit board) assembly of the exemplary speaker assembly shown in FIG. 1.
Figure 3:
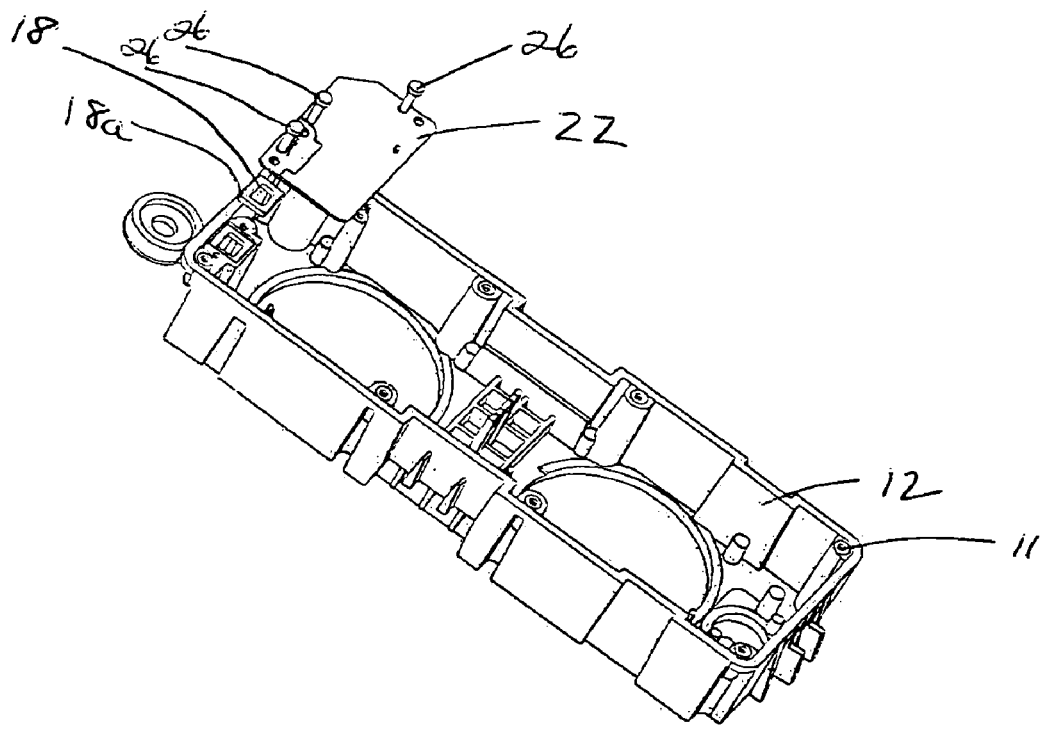
FIG. 3 depicts a top, side view of a portion of the speaker housing, an interface connector and a crossover PCB (printed circuit board) assembly of the exemplary speaker assembly shown in FIG. 1.

FIGS. 2 and 3 depict a bottom, side view and a top, side view of a portion of the speaker enclosure 12, an interface connector 20 and a crossover PCB (printed circuit board) assembly 22 of the exemplary speaker housing 10 shown in FIG. 1, respectively. The speaker enclosure 12 includes an opening 18 for sealing a crossover board connector 20 attached to a crossover printed circuit board assembly 22 thereto. The crossover board connector 20 protrudes through the opening 18 in the speaker enclosure 12 while the printed circuit board assembly 22 to which it is attached compresses a compressible gasket 24 against the opening wall 18a surrounding the opening 18, sealing the connector 20 thereto when the printed circuit board assembly 22 is attached to the speaker enclosure 12 using a plurality of attachment members 26. The chassis wiring (not shown) is coupled to the connector 20 providing an inexpensive sealed interface between the electronics chassis (not shown) and the crossover printed circuit board assembly 22.

The crossover board connector 20 may for example be directly soldered to the crossover printed circuit board assembly 22. The compressible gasket 24 may be formed of a compressible material such as, for example, foam or rubber. The attachment members 26 may include, for example, screws or clips (not shown).

Although an exemplary speaker housing which incorporates the teachings of the present invention has been shown and described in detail herein, those skilled in the art can readily devise many other varied embodiments that still incorporate these teachings.

What is claimed is:

1. A speaker housing, comprising:
   a speaker cover;
   a speaker enclosure sealed to the speaker cover; and
   a connector attached to a printed circuit board assembly, mounted within the speaker enclosure, wherein the connector protrudes through an opening in the speaker enclosure and is seated thereto with a compressible gasket, when the printed circuit board assembly is attached to the speaker enclosure.

2. The speaker housing of claim 1 wherein at least one of the speaker cover and the speaker enclosure are formed of injection-molded plastic.

3. The speaker housing of claim 1 wherein the compressible gasket is formed of a material selected from the group of foam and rubber.

4. The speaker housing of claim 1 wherein the connector is solder attached to the printed circuit board assembly.

5. A television cabinet including a speaker housing, comprising:
   a speaker cover;
   a speaker enclosure sealed to the speaker cover; and
   a connector attached to a printed circuit board assembly, mounted within the weaker enclosure, wherein the connector protrudes through an opening in the speaker enclosure and is sealed thereto with a compressible gasket, when the printed circuit board assembly is attached to the speaker enclosure.

6. The television cabinet of claim 5 wherein at least one of the speaker cover and the speaker enclosure are formed of injection-molded plastic.

7. The television cabinet of claim 5 wherein the compressible gasket is formed of a material selected from the group of foam and rubber.

8. The television cabinet of claim 5 wherein the connector is solder attached to the printed circuit board assembly.

* * * * *